United States Patent [19]
Erpelding et al.

[11] Patent Number: 5,585,979
[45] Date of Patent: Dec. 17, 1996

[54] ASSEMBLY AND METHOD FOR WIRE ENCAPSULATION WITHIN HEAD GIMBAL ASSEMBLIES OF DASD FILES

[75] Inventors: A. David Erpelding, San Jose, Calif.; Harald R. Lindner, Mainz, Germany; Juergen Netzker, Ingelheim, Germany; Thomas Steinbrenner, Lonsheim, Germany

[73] Assignee: International Business Machines Corporation, Armonk, N.Y.

[21] Appl. No.: 412,403

[22] Filed: Mar. 28, 1995

[51] Int. Cl.$^6$ .............................. G11B 5/48; H01R 43/00
[52] U.S. Cl. .................. 360/104; 360/108; 29/603.03; 29/872; 156/51; 156/180; 156/296
[58] Field of Search ............................ 360/103, 104, 360/108, 97.01, 98.01; 156/48, 51, 166, 180, 296; 29/603.03, 871, 872

[56] References Cited

U.S. PATENT DOCUMENTS

| | | | |
|---|---|---|---|
| 4,002,282 | 1/1977 | Murdoch | 228/4.5 |
| 4,642,321 | 2/1987 | Schoenberg et al. | 523/400 |
| 4,645,280 | 2/1987 | Gordon et al. | 339/17 |
| 4,792,875 | 12/1988 | Ohdaira | 360/104 |
| 4,797,509 | 1/1989 | Cook | 29/871 |
| 4,814,028 | 3/1989 | Sawaki et al. | 156/48 |
| 4,991,045 | 2/1991 | Oberg | 360/104 |
| 5,012,368 | 4/1991 | Bosier et al. | 360/104 |
| 5,027,239 | 6/1991 | Hagen | 360/108 |
| 5,074,029 | 12/1991 | Brooks, Jr. et al. | 29/603 |
| 5,121,273 | 6/1992 | Slezak | 360/108 |
| 5,124,865 | 6/1992 | Atesmen et al. | 360/103 |
| 5,235,741 | 8/1993 | Mase | 29/872 |
| 5,282,103 | 1/1994 | Hatch et al. | 360/104 |
| 5,391,842 | 2/1995 | Bennin et al. | 360/108 |
| 5,442,504 | 8/1995 | Nagase et al. | 360/104 |
| 5,470,517 | 11/1995 | Conley | 156/180 |
| 5,486,655 | 1/1996 | Arike et al. | 174/259 |
| 5,491,597 | 2/1996 | Bennin et al. | 360/108 |

FOREIGN PATENT DOCUMENTS

| | | |
|---|---|---|
| 0294921 | 12/1990 | Japan. |
| 404069803A | 3/1992 | Japan. |
| 404310619A | 11/1992 | Japan. |
| 5-182167A | 7/1993 | Japan. |
| 405282643A | 10/1993 | Japan. |

OTHER PUBLICATIONS

Weirick, J. A., "Conductive Epoxy Wire . . . ," IBM TDB, vol. 34 No. 8, Jan. 1992, pp. 284–285.
McCormick, W., "Magnetic Head Assembly," IBM TDB, vol. 18, No. 9, Feb. 1976, pp. 2801–2802.
Albrecht, D. W., "Wire Support Structure . . . ," IBM TDB, vol. 37 No. 5, May 1994, pp. 391–392.
Wood, J. C., "Fast Gelling of Epoxy . . . ," IBM TDB, vol. 37 No. 02B, Feb. 1994, p. 611.

Primary Examiner—Jefferson Evans
Attorney, Agent, or Firm—Douglas R. Millett; Andrew J. Dillon

[57] ABSTRACT

A method and assembly are disclosed for bundling wires utilized in a head gimbal assembly of a magnetic disk storage device. According to the method of the present invention, a number of wires are routed along a predetermined path on a surface of the arm of the head gimbal assembly. While the wires are maintained along the predetermined path, an adhesive is dispensed at selected locations along the predetermined path. According to a preferred embodiment of the present invention, the adhesive is applied in a contiguous manner along the length of the wires extending beyond the end of the arm. Finally, the adhesive is cured to encapsulate a portion of the wires within a sleeve of adhesive. In an alternate embodiment of the present invention, the adhesive is dispensed over the wires in a plurality of non-contiguous segments.

20 Claims, 4 Drawing Sheets

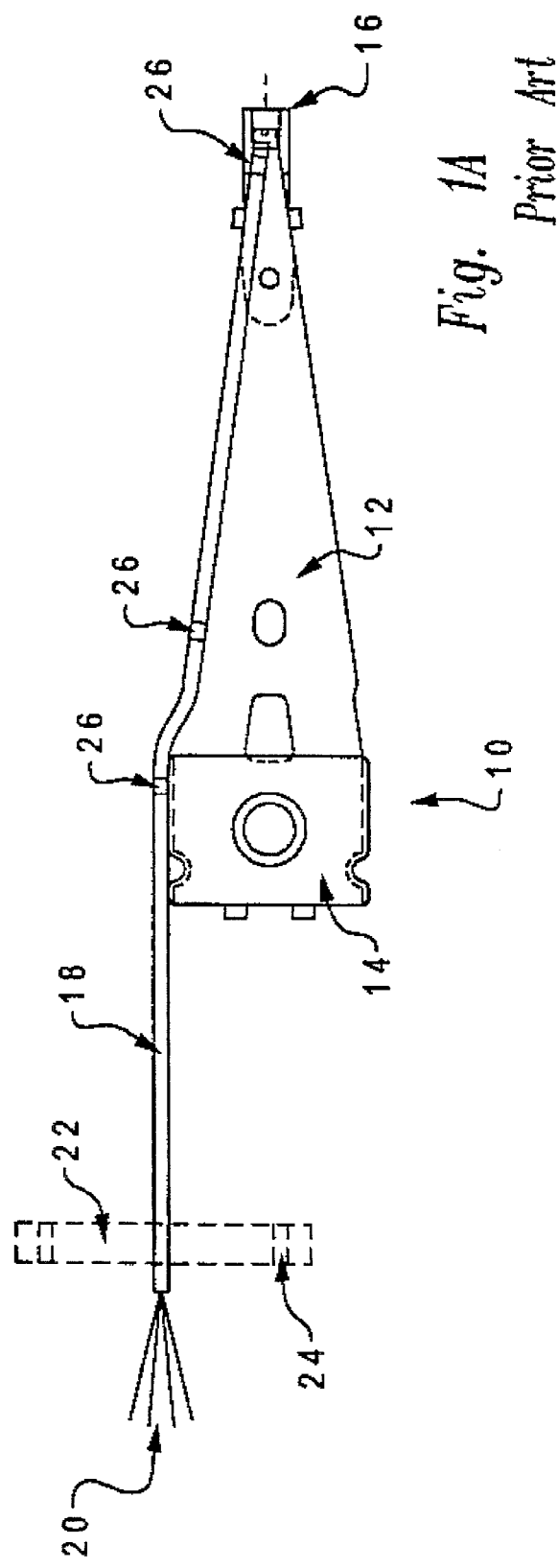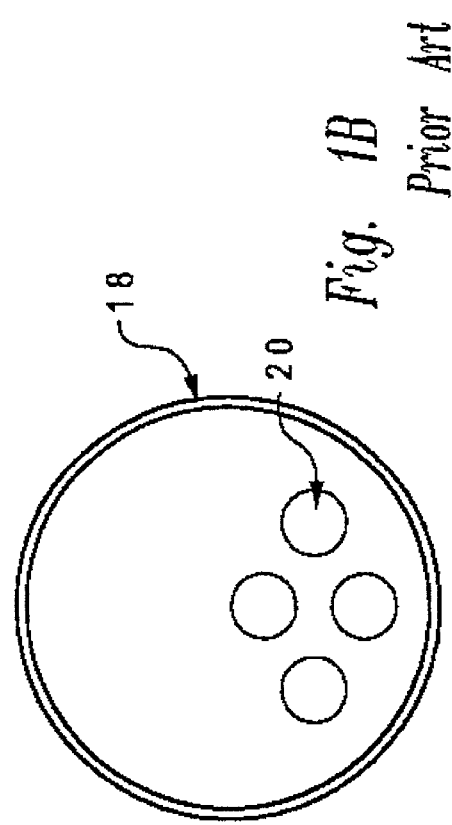
Fig. 1A Prior Art
Fig. 1B Prior Art

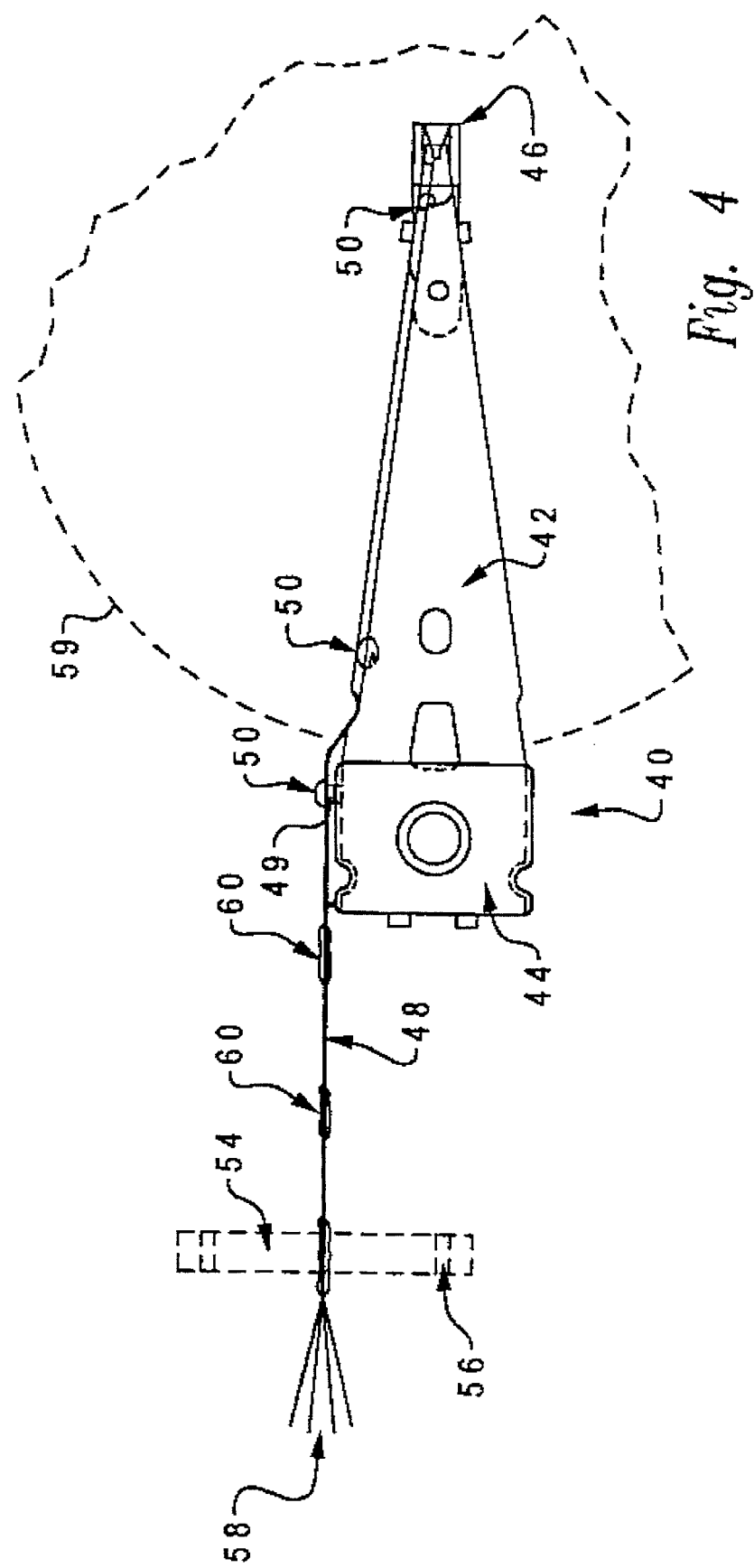

ASSEMBLY AND METHOD FOR WIRE ENCAPSULATION WITHIN HEAD GIMBAL ASSEMBLIES OF DASD FILES

BACKGROUND OF THE INVENTION

1. Technical Field

The present invention relates in general to an assembly and method for bundling wires, and in particular to an improved assembly and method for encasing wires utilized within a head gimbal assembly of a DASD file. Still more particularly, the present invention relates to an improved assembly and method for automated encapsulation of a wire bundle utilized within a head gimbal assembly of a DASD file.

2. Description of the Related Art

Within magnetic disk storage devices, head gimbal assemblies (HGAs) are utilized to support a magnetic head over a magnetic disk. With reference now to FIG. 1A, there is illustrated a top plan view of a conventional HGA. As illustrated, HGA 10 includes arm 12, mount 14, and head 16. In general, mount 14 is rigidly fixed to a moving carriage within the access mechanism of the magnetic disk storage device. Arm 12 includes a proximate end which is secured to mount 14 and a distal end to which head 16 is attached. Arm 12 functions as a spring which enables head 16 to float above a magnetic disk (not illustrated). Electrical impulses transduced by head 16 from data stored on the magnetic disk are conducted to electronics (not illustrated) within the magnetic disk storage device by wires 20, which commonly comprise two sets of twisted-pair wire. As depicted, wires 20 are encased in tube 18, which in turn is secured to HGA 10 by clips 26. One end of tube 18 is secured to bracket 22 by interference fit into one of slots 24.

With reference now to FIG. 1B, there is depicted a cross sectional view of tube 18 which contains wires 20. As illustrated, along the length of wires 20 encased by tube 18, wires 20 are not held at a fixed relationship to each other, but simply lie within tube 18. Because wires 20 may move with respect to each other during the positioning of arm 12, portions of the twisted pair typically comprising wires 20 may become untwisted, creating inconsistent electrical characteristics along the length of wires 20 and increasing the mutual inductance between the twisted pair. In addition, movement of wires 20 within tube 18 increases the noise component of the signals conducted by wires 20, concomitantly decreasing the signal to noise ratio.

Tube 18 is utilized within HGA 10 for a variety of reasons. First, tube 18, which is typically formed of flexible plastic, provides a mechanical structure that may be secured to HGA 10 during assembly utilizing clips 26. In addition, tube 18 is easily secured to bracket 22 by interference fit. Finally, encasing wires 20 within tube 18 insures that wires 20 are protected and held in a safe position during subsequent steps of the assembly of the magnetic disk storage device.

To minimize assembly costs, manufacturers of magnetic disk storage devices, such as International Business Machines Corporation, have become interested in utilizing automated assembly lines to assemble HGAs. Although currently available sophisticated assembly line equipment can perform some steps of the assembly process such as automatically attaching wires 20 to arm 12 and head 16 to arm 12, other assembly steps cannot easily be performed by automated equipment. For example, it is difficult, if not impossible, for an automated assembly line to place a conventional tube 18 over wires 20 while HGA 10 is in process. Consequently, industry has heretofore relied on low-cost manual labor to assemble HGA 10 utilizing one of a variety of techniques. For example, with reference to FIG. 1A, one assembly method is as follows. A precut bundle of wire 20 is inserted into tube 18 at a facility separate from the HGA assembly plant. This wire and tube assembly is purchased and brought to the HGA assembly area. At the HGA assembly area, a worker attaches wires 20 to head 16 and places head 16 with wires 20 attached into a tool block. Arm 12 is attached to mount 14 and is also placed by the worker into the same tool block. The worker then affixes head 16 to arm 12 with a suitable adhesive. Finally, the worker attaches tube 18 to HGA 10 by crimping clips 26 around tube 18. Care must be taken by the worker to avoid damaging wires 20 while in the process of crimping clips 26. Because the foregoing assembly steps, and in particular the steps performed to insert wires 20 into tube 18 and to attach tube 18 to HGA 10 are time consuming as compared to an automated assembly process, the cost associated with manual labor has traditionally been a major component of HGA assembly cost.

Consequently, it would be desirable to provide a method and assembly which enable fully automated assembly of head gimbal assemblies within magnetic disk storage devices.

SUMMARY OF THE INVENTION

It is therefore one object of the present invention to provide an assembly and method for bundling wires.

it is another object of the present invention to provide an improved assembly and method for encasing wires utilized within a head gimbal assembly of a DASD file.

It is yet another object of the present invention to provide an improved assembly and method for automated encapsulation of a wire bundle utilized within a head gimbal assembly of a DASD file.

The foregoing objects are achieved as is now described. A method and assembly are disclosed for bundling wires utilized in a head gimbal assembly of a magnetic disk storage device. According to the method of the present invention, a number of wires are routed along a predetermined path on a surface of the arm of the head gimbal assembly. While the wires are maintained along the predetermined path, an adhesive is dispensed at selected locations along the predetermined path. According to a preferred embodiment of the present invention, the adhesive is applied in a contiguous manner along the length of the wires extending beyond the end of the arm. Finally, the adhesive is cured to encapsulate a portion of the wires within a sleeve of adhesive. In an alternate embodiment of the present invention, the adhesive is dispensed over the wires in a plurality of non-contiguous segments.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A illustrates a prior art head gimbal assembly in which the wires attached to the head are encased in a plastic tube;

FIG. 1B depicts a cross section of the plastic tube utilized in the prior art head gimbal assembly illustrated in FIG. 1A;

FIG. 4 depicts a second preferred embodiment of a head gimbal assembly constructed according to the method of the present invention in which adhesive encapsulates non-contiguous segments of the wires attached to the head.

DETAILED DESCRIPTION OF PREFERRED EMBODIMENT

Figure 2A:
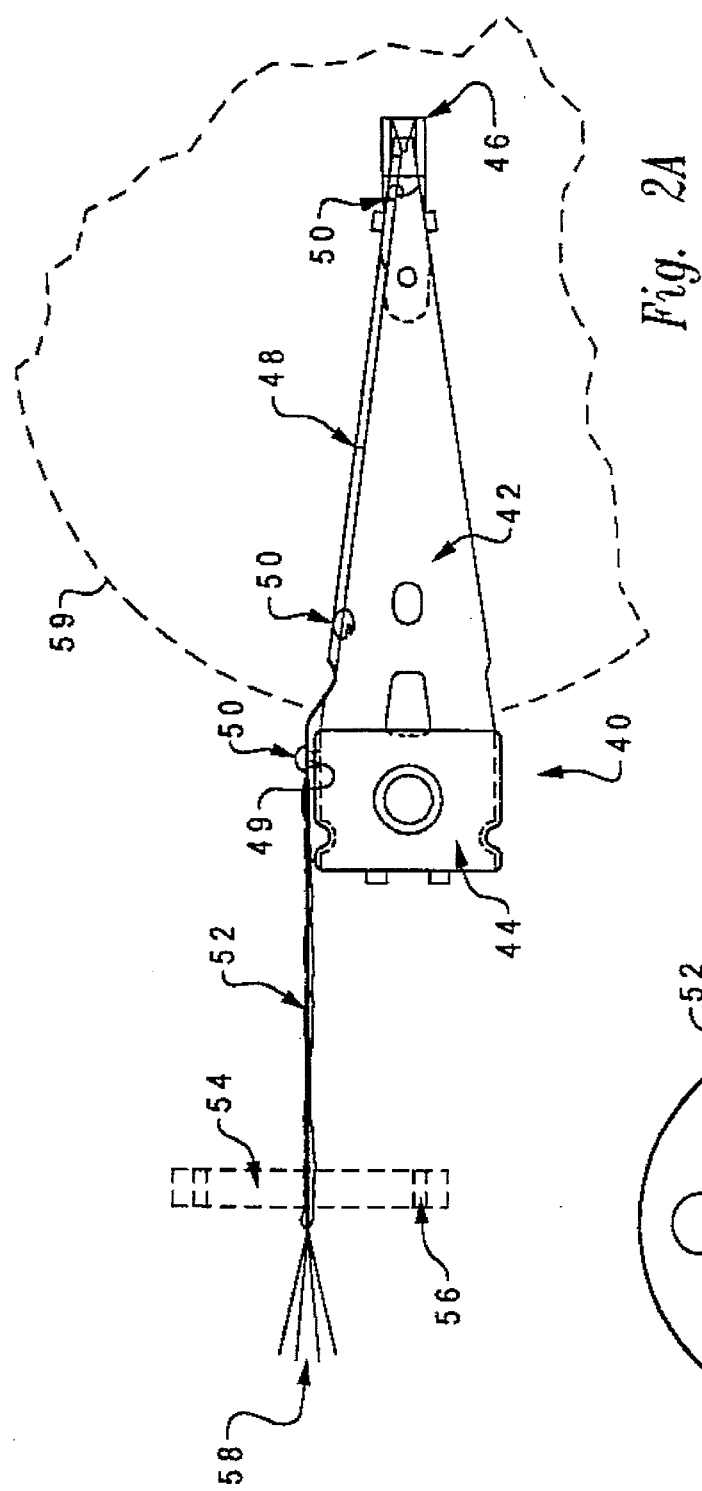
FIG. 2A illustrates a first preferred embodiment of a head gimbal assembly constructed according to the present invention in which a portion of the wires attached to the head are encapsulated with an adhesive.

With reference now to the figures and in particular with reference to FIG. 2A, there is illustrated a preferred embodiment of a head gimbal assembly constructed according to the method of the present invention. As depicted, head gimbal assembly (HGA) 40 includes arm 42, mount 44, and head 46. Like conventional HGAs, HGA 40 also includes wires 48 which conduct signals transduced by head 46 from magnetic disk 59 to an electronic device within the magnetic disk storage device such as a signal preamplifier. Unlike prior art HGAs exemplified by HGA 10 illustrated in FIG. 1A, wires 48 within HGA 40 are not encased within a plastic tube, but are exposed between head 46 and mount tab 49. Between head 46 and mount tab 49, wires 48 are attached to arm 42 and mount tab 49 utilizing glue dots 50, which in a preferred embodiment of the present invention comprise small amounts of ultraviolet (UV) sensitive adhesive.

According to a preferred embodiment of the present invention, the adhesive which comprises glue dots 50 is also utilized to encapsulate wires 48 within glue tube 52 between mount tab 49 and bracket 54, which is a component of the actuator assembly (not illustrated) that positions HGA 40 over magnetic disk 59. The adhesive encapsulation forming glue tube 52 enables distal end 58 of wires 48 to be interference fit into one of slots 56 within bracket 54, thereby providing both a means of attachment and strain relief for wires 48. As illustrated, at distal end 58, the portion of wires 48 extending beyond glue tube 52 is exposed in preparation for termination to an electronic device such as a signal preamplifier at a subsequent processing step.

Figure 2B:
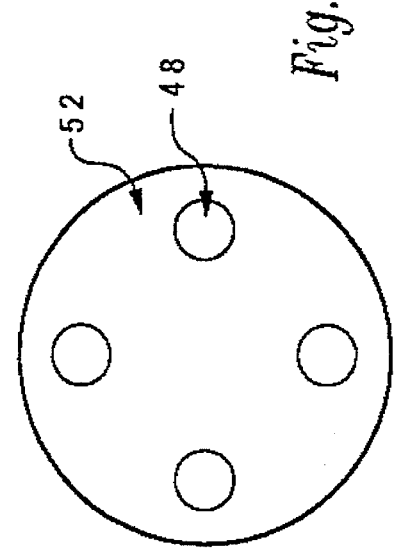
FIG. 2B depicts a cross sectional view of the wire encapsulation illustrated in FIG. 2A.

Referring now to FIG. 2B, there is depicted a cross sectional view of glue tube 52. As illustrated, glue tube 52 has a substantially uniform diameter and holds wires 48 at fixed positions with respect to each other. In a preferred embodiment of the present invention in which wires 48 comprise two sets of twisted-pair wire, glue tube 52 eliminates two of the disadvantages of a conventional plastic tube, namely the potential for the twisted pair to untwist and the noise generated by the motion of the twisted pair with respect to each other. The method of the present invention utilized to encapsulate wires 48 within glue tube 52 will now be described with reference to FIG. 3.

Figure 3:
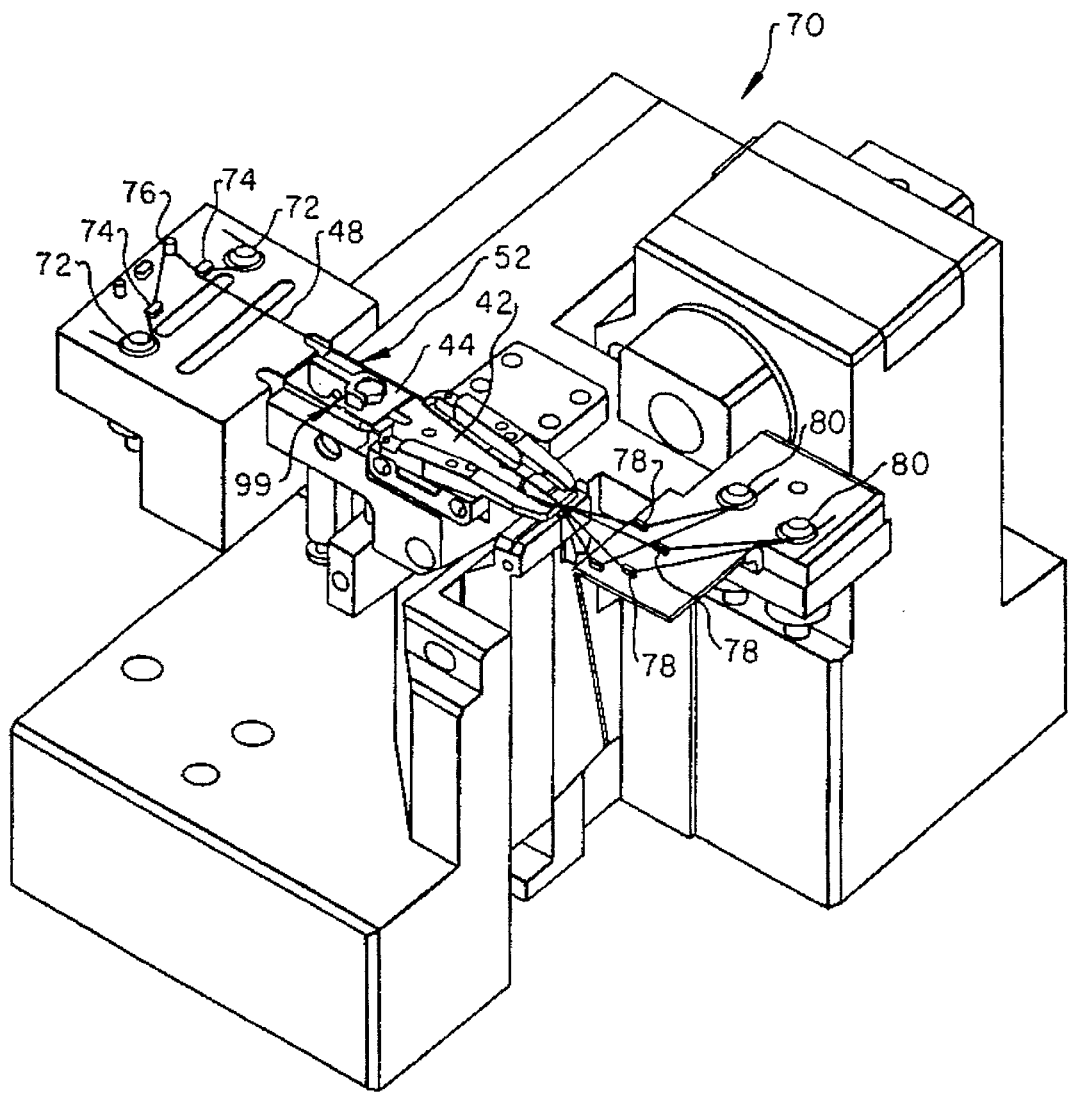
FIG. 3 illustrates an isometric view of a tool block utilized for holding the head gimbal assembly depicted in FIG. 2A during assembly according to the method of the present invention.

With reference now to FIG. 3, there is illustrated a preferred embodiment of tool block 70 utilized to hold HGA 40 during automated assembly. The automated assembly process begins when tool block 70, supporting a partially assembled HGA 40 comprising arm 42 and mount 44, is received at an automated wire routing station. According to the present invention, head 46 may already be attached to arm 42 when tool block 70 is received at the wire routing station or may be attached at a later step of the assembly process. At the wire routing station, wire is provided spooled on two bobbins which are mounted on a robotic arm. The robotic arm positions the free ends of the two wires in clamps 80, which secure the two wires to tool block 70. Thereafter, the robotic arm strings the wires around guides 78 to pattern the wires for termination to head 46 at a later processing step. The robotic arm strings the wires toward distal end 99 of HGA 40 following a preprogrammed route along HGA 40 demarked by positioning pins (not illustrated) protruding from tool block 70. As the robotic arm travels along the preprogrammed route, the end of the robotic arm rotates about an axis parallel to its direction of travel, thereby forming a twisted pair of wire. Once the robotic arm has routed the two wires along the length of HGA 40, the robotic arm then retraces its previous route in reverse, again rotating about an axis parallel to its direction of travel, thereby forming a bundle of two sets of twisted-pair wire. Thereafter, a trimming tool cuts the portion of the two wires grasped by the robotic arm to free tool block 70 from the wire routing apparatus.

At the next stage of processing, tool block 70 is received at an automated adhesive dispenser, such as that manufactured by Asymtek. As illustrated in FIG. 3, when tool block 70 is received at the adhesive dispenser, wires 48 are routed along HGA 40 and are held between spools 72 and 80 at a defined tension. Placing wires 48 under tension enhances the uniformity of the encapsulation by suspending the portion of wires 48 which will be encapsulated in a free-hanging position over tool block 70. The adhesive dispenser then dispenses adhesive along wires 48. As depicted in FIG. 2A, the adhesive dispenser dispenses three glue dots 50 to attach the exposed portion of wires 48 between head 46 and mount tab 49 to arm 42 and mount tab 49. In addition, the automated adhesive dispenser dispenses adhesive to encapsulate wires 48 within glue tube 52. In a first preferred embodiment, the dispensing tip passes along wires 48 at a software-controlled velocity continuously dispensing adhesive. Due to the viscosity of the adhesive and the capillary effect between wires 48, the adhesive forms an encapsulation around wires 48 of substantially uniform diameter.

In a second preferred embodiment of the present invention where optimum uniformity of glue tube 52 is desirable, the automated adhesive dispenser makes two passes. During the first pass, a pre-defined amount of adhesive is dispensed at each of a number of sequential locations (teachpoints) along wires 48. Then, the dispensing tip performs an idle stroke to smooth the deposited adhesive without dispensing any additional adhesive. The second preferred embodiment of the method of the present invention enables an operator to exercise precise control over the resulting diameter of glue tube 52 by adjusting several factors, including the amount of adhesive dispensed, the viscosity of the adhesive (which is controlled by the temperature), and the number of dispense locations. Those skilled in the art will appreciate that these factors may be controlled by suitable software executing within a data processing system associated with the automated adhesive dispenser.

Thereafter, the adhesive dispensed by the automated adhesive dispenser is cured. In a preferred embodiment of the present invention in which the adhesive comprises an ultraviolet (UV) sensitive adhesive, such as EMCAST 1728 produced by Vitralit, the adhesive is cured by irradiating HGA 40 with ultraviolet energy. For example, tool block 70 may be processed for approximately seven seconds within an ultraviolet oven. When cured, glue tube 52 forms a protective flexible encapsulation around wires 48, as illustrated in FIG. 2B. Although a preferred embodiment of the present invention utilizes a UV sensitive adhesive to form glue tube 52, those skilled in the art will appreciate that other suitable adhesives may be utilized.

Tool block 70 then passes from the automated adhesive dispenser to a subsequent processing station at which head 46 is attached to arm 42 (if not attached prior to the above-described steps of wire routing and encapsulation). In addition, wires 48 are trimmed from clamps 80 and 72 and terminated to head 46.

With reference now to FIG. 4, there is illustrated a second preferred embodiment of a head gimbal assembly constructed according to the method of the present invention. As is indicated by like reference numerals, HGA 40 includes arm 42, mount 44, head 46, and wires 48 as hereinbefore described. However, in contrast to glue tube 52 illustrated in FIG. 2A, FIG. 4 depicts a number of tube segments 60 encapsulating wires 48. Wires 48 may be encapsulated by tube segments 60 utilizing either of the two adhesive encapsulation methods described above. Like glue tube 52, tube segments 60 protect wires 48 during subsequent processing steps and provide a mechanical structure that may be interference fit into a slot 56 in bracket 54. However, the encapsulation provided by tube segments 60 has greater flexibility than glue tube 52 due to the portions of wires 48 which are exposed.

As has been described, the present invention provides an assembly and method which enable the fully automated assembly of wires utilized within the head gimbal assembly of a magnetic disk storage device. By utilizing an adhesive to encapsulate the wires, rather than a conventional plastic tube, the assembly cost of head gimbal assemblies is greatly reduced since the routing, attaching, and encapsulating of the wires may be performed by an automated assembly line, rather than by manual labor. In addition, because the wire encapsulation of the present invention holds each wire at a fixed position relative to the other wires and to the glue tube, the present invention provides a low noise wire assembly having uniform electrical characteristics.

While the invention has been particularly shown and described with reference to a preferred embodiment, it will be understood by those skilled in the art that various changes in form and detail may be made therein without departing from the spirit and scope of the invention.

What is claimed is:

1. A method of bundling wires utilized within a head gimbal assembly of a magnetic disk storage device, said head gimbal assembly including a supporting arm, said method comprising:

routing a plurality of wires along a predetermined path, wherein at least a portion of said predetermined path is on a surface of said supporting arm;

maintaining said plurality of wires along said predetermined path;

dispensing an adhesive at selected locations along said predetermined path; and curing said adhesive to encapsulate a lengthwise portion of said plurality of wires within a sleeve, wherein following curing said sleeve encapsulating said lengthwise portion of said plurality of wires is freely movable with respect to said supporting arm.

2. The method of bundling wires of claim 1, wherein said step of dispensing said adhesive comprises dispensing said adhesive over said plurality of wires in a plurality of non-contiguous segments.

3. The method of bundling wires of claim 1, wherein said step of dispensing an adhesive comprises:

dispensing a continuous bead of adhesive along said lengthwise portion of said plurality of wires in a single pass of a dispenser.

4. The method of bundling wires of claim 1, wherein said step of dispensing an adhesive comprises:

in a first pass of a dispenser, dispensing an amount of adhesive at a plurality of points along said plurality of wires; and in a second pass of said dispenser, smoothing said dispensed adhesive utilizing said dispenser without dispensing additional adhesive, thereby increasing uniformity of said sleeve.

5. The method of bundling wires of claim 1, wherein said step of curing said adhesive comprises:

exposing said adhesive to ultraviolet (UV) radiation.

6. The method of bundling wires of claim 1, wherein said lengthwise portion of said plurality of wires encapsulated within said adhesive sleeve extends beyond said supporting arm.

7. The method of bundling wires of claim 1, and further comprising the step of placing said plurality of wires under tension prior to performing said dispensing step.

8. A wire assembly utilized within a head gimbal assembly of a magnetic disk storage device, said head gimbal assembly including a supporting arm, said wire assembly comprising:

a wire bundle including a plurality of wires, wherein said wire bundle is attached to said supporting arm; and wherein at least a lengthwise portion of said wire bundle is solely encapsulated by an adhesive which when cured forms a sleeve that is freely movable with respect to said supporting arm.

9. The wire assembly of claim 8, wherein said adhesive cures when exposed to ultraviolet (UV) radiation.

10. The wire assembly of claim 8, and further comprising:

a bead of adhesive utilized to secure said wire bundle to said arm of said head gimbal assembly.

11. The wire assembly of claim 8, wherein said adhesive encapsulates said lengthwise portion of said wire bundle in a plurality of non-contiguous segments.

12. The wire assembly of claim 8, wherein said lengthwise portion of said wire bundle encapsulated within said adhesive extends beyond said supporting arm.

13. A head gimbal assembly, comprising:

an arm;

a head attached to a first end of said arm, wherein said head includes a magnetic transducer which converts data stored within a magnetic media into electrical signals;

a mount to which a second end of said arm is attached;

a wire bundle including a plurality of wires, wherein said wire bundle is electrically coupled to said magnetic transducer; and wherein at least a lengthwise portion of said wire bundle is solely encapsulated by an adhesive which when cured forms a sleeve that is freely movable with respect to said supporting arm.

14. The head gimbal assembly of claim 13, and further comprising:

a bead of adhesive utilized to secure said wire bundle to said arm.

15. The head gimbal assembly of claim 13, wherein at an end of said wire bundle proximate to said second end of said arm, said plurality of wires within said bundle are exposed for termination to an electronic device.

16. The head gimbal assembly of claim 13, wherein said adhesive encapsulates said lengthwise portion of said wire bundle in a plurality of non-contiguous segments.

17. The head gimbal assembly of claim 13, wherein said lengthwise portion of said wire bundle encapsulated within said adhesive extends beyond said supporting arm.

18. A wire assembly utilized within a head gimbal assembly of a magnetic disk storage device, said head gimbal assembly including a supporting arm, said wire assembly comprising:

a wire bundle including a plurality of wires, wherein said wire bundle is attached to said supporting arm; and an adhesive sleeve encapsulating at least a lengthwise portion of said wire bundle;

said adhesive sleeve being formed by dispensing an amount of adhesive at a plurality of points along said wire bundle in a first pass of a dispenser, smoothing said dispensed adhesive in a second pass of said dispenser without dispensing additional adhesive, and curing said adhesive to encapsulate said lengthwise portion of said wire bundle within a sleeve.

19. The wire assembly of claim 18, and further comprising:

a bead of adhesive utilized to secure said wire bundle to said arm of said head gimbal assembly.

20. The wire assembly of claim 18, wherein said adhesive sleeve comprises a plurality of non-contiguous sleeve segments.

* * * * *